United States Patent
Proebster et al.

(10) Patent No.: US 6,919,397 B2
(45) Date of Patent: Jul. 19, 2005

(54) TWO-COMPONENT POLYSULPHIDE ADHESIVE/SEALANT

(75) Inventors: Manfred Proebster, Nussloch (DE); Stefan Grimm, Schwetzingen (DE)

(73) Assignee: Henkel-Teroson GmbH (Henkel-Teroson), Heidelberg (DE)

(*) Notice: Subject to any disclaimer, the term of this patent is extended or adjusted under 35 U.S.C. 154(b) by 215 days.

(21) Appl. No.: 10/296,117

(22) PCT Filed: May 10, 2001

(86) PCT No.: PCT/EP01/05338

§ 371 (c)(1),
(2), (4) Date: Nov. 22, 2002

(87) PCT Pub. No.: WO01/90222

PCT Pub. Date: Nov. 29, 2001

(65) Prior Publication Data

US 2004/0014878 A1 Jan. 22, 2004

(30) Foreign Application Priority Data

May 23, 2000 (DE) ........................ 100 25 529

(51) Int. Cl.⁷ ................................ C08K 5/01
(52) U.S. Cl. ................ 524/474; 524/492; 524/500; 524/588
(58) Field of Search ................ 524/474, 492, 524/500, 588

(56) References Cited

U.S. PATENT DOCUMENTS 3,659,896 A * 5/1972 Smith et al. .................. 296/93

| 3,925,947 A | 12/1975 | Meyers et al. |
| 4,623,711 A | 11/1986 | Morris et al. |
| 4,742,125 A | 5/1988 | Schmidt et al. |
| 4,766,195 A | 8/1988 | Labat |

FOREIGN PATENT DOCUMENTS

| DE | 2 222 782 | 11/1973 |
| DE | 26 35 570 A1 | 2/1978 |
| DE | 35 08 428 A1 | 9/1986 |
| EP | 0 176 439 B1 | 4/1988 |
| EP | 0 268 836 A2 | 6/1988 |
| GB | 1 423 705 | 2/1976 |
| WO | WO 82/01879 A1 | 6/1982 |

OTHER PUBLICATIONS

A. Damusis, "Sealants", New York, pp. 182–184 (1967).
E. Dachselt, "Thioplaste", Leipzig, pp. 50–56 (1971).
H. Lucke, "Monographie eines Elastomeren", Aliphatische Polysulfide, Heidelberg, pp. 111–114 (1992).
R. M. Sharpe et al., "Are oestrogens involved in falling sperm counts and disorders of the male reproductive tract?", Lancet, vol. 341, pp. 1392–1395 (1993).

* cited by examiner

Primary Examiner—William K. Cheung
(74) Attorney, Agent, or Firm—Woodcock Washburn LLP

(57) ABSTRACT

The use of benzoate plasticizers in two-component insulating glass adhesives/sealants based on polysulfide polymers or polymercaptan polymers enables simpler production due to the low viscosity thereof. Improved miscibility of the two components and an improved rate of curing are observed. In addition, the use of phthalate plasticizers, which may possibly cause an endocrinal effect in humans and animals, is avoided.

17 Claims, No Drawings

TWO-COMPONENT POLYSULPHIDE ADHESIVE/SEALANT

BACKGROUND OF THE INVENTION

1. Field of the Invention

This invention relates to two-component insulating glass adhesives/sealants based on liquid polysulfide and/or polymercaptan polymers which contain benzoates as plasticisers.

2. Discussion of Related Art

Single-/multi-component compositions based on polysulfide polymers and/or polymercaptan polymers have been used successfully for a long time in construction and civil engineering, in the aircraft and vehicle industries, in shipbuilding and on a large scale for the manufacture of insulating glass. One of the main reasons why a very high market share of insulating glass adhesives/sealants is based on polysulfide polymers or polymercaptan polymers is that these polymers are characterised by a high resistance to ozone and also very good resistance to many solvents and chemicals. In addition, they have a very high long-term resistance to the effects of weather and are characterised by very low permeability to gases. For more information on this, see, for example, A. Damusis, "Sealants", New York (1967), pages 182–184; E. Dachselt, "Thioplaste" Leipzig (1971), pages 50–56 or H. Lucke, "Aliphatische Polysulfide", Heidelberg (1992), pages 111–114.

Adhesives/sealants for insulating glass composite materials are usually formulated as two-component systems in which the two components are brought together, mixed and applied only just before use.

In this type of two-component material, one component usually contains the binder, in this case a liquid polysulfide polymer or liquid polymercaptan polymer. This component is usually termed component "A". The second component contains a cross-linking, curing or oxidising agent and is usually termed component "B". Furthermore, both components generally contain plasticisers, fillers and optionally pigments or colorants. In addition, component A may also contain adhesion-promoting substances and antioxidants and component B may also contain accelerators.

The number of plasticisers which are compatible with polysulfide polymers or polymercaptan polymers is very limited. Apart from a small number of phthalates, chlorinated paraffins, butyl diglycols or hydrogenated terphenyls may be used in two-component adhesives/sealants based on polysulfides or polymercaptans. Chlorinated paraffins are not generally used now, for environmental reasons. Apart from compatibility and resistance to ageing, plasticisers which are suitable for insulating glass adhesives/sealants also have to have a very low vapor pressure so that condensation is not formed in the insulating glass unit. This means that the insulating glass unit has to have "fog-free" or "non-fogging" properties. Furthermore, the plasticiser has to have sufficiently high viscosity to prevent the powdered components, in particular in component B, settling out, so that phase separation does not occur during the time the components are stored. This restricts the selection of suitable plasticisers very considerably so that from among the esters of phthalic acid, butylbenzyl phthalate is now used almost exclusively in component A and the highly viscous plasticiser 7-(2,6,6,8-tetramethyl-4-oxa-3-oxononyl)-benzyl phthalate, also known by the tradename "Santicizer 278" (Solutia Co.), is used in component B.

Recently, a few study groups have indicated that phthalates may exert an endocrinal effect in the uterus and that the sperm counts in male offspring may be reduced. Benzylbutyl phthalate is also mentioned expressly in this connection. For more information, see, for example, the publications by R. M. Sharpe, N. E. Skakkebaek; "Are oestrogens involved in falling sperm counts and disorders of the male reproductive tract?", Lancet 341 (1993), p. 1392–1395. Also, more recent publications on the Internet by P.M.D. Foster, http://www.ciit.org/ACT97/ACTIVITIESSEPT97/sept97.html and by R. M. Sharpe, J. S. Fisher, Mike M. Millar, S. Jobling and John P. Sumpter, http://ehpnet1.niehs.nih.gov/docs/1995/103-12/sharpe.html indicate similar risks which are attributed to phthalate plasticisers.

It has not hitherto been possible to exclude highly viscous phthalates from component B of insulating glass adhesives/sealants because, on the one hand, these are compatible with the polysulfide polymers or polymercaptan polymers used and prevent settling out of the disperse constituents and, on the other hand "fogging" is avoided. A disadvantage of using so-called highly viscous phthalates has been firstly that they are very difficult to pump and secondly that it is difficult to mix the two components A and B thoroughly during application.

Thus, an object of the present invention is to find a plasticiser for two-component adhesives/sealants based on polysulfide polymers and/or polymercaptan polymers which does not have the disadvantages of the prior art described above and about which no negative biological effects are known.

SUMMARY OF THE INVENTION

The solution according to the present invention is given in the claims and this consists essentially in that binder-containing component A contains:
15 to 35 wt. % of liquid polysulfide and/or polymercaptan polymer
5 to 20 wt. % of at least one beiizoate plasticiser
30 to 65 wt. % of fillers
0.1 to 7 wt. % of a silane adhesion promoter
and curing component B contains:
20 to 45 wt. % of at least one benzoate plasticiser
0.1 to 40 wt. % of at least one copolymer
10 to 40 wt. % of an oxidising agent
1 to 5 wt. % of accelerator
15 to 35 wt. % of fillers
wherein the totals of the constituents in components A and B are each 100 wt. %.

DETAILED DESCRIPTION OF THE INVENTION

DE-A-2222782 describes insulating glass polysulfide sealants which are intended to be mixed with premixtures of butyl rubber, calcium carbonate and benzoates. However, these compositions also contain dioctyl phthalate as plasticiser. Two-component insulating glass adhesives/sealants which do not contain a phthalate as plasticiser are not disclosed in this document.

U.S. Pat. No. 3,925,947 describes the sealing of windscreens in vehicles with the aid of elastomeric hot-melt adhesives as sealing compositions. For these hot-melt adhesives, a number of thermoplastic elastomers, as elastic polymers, are suggested, including solid polysulfide polymers of the Thiokol FA, ST type. The plasticisers suggested for use with these are polybutenes, phosphate esters, phthalates, paraffin oils, chlorinated paraffins, and also tars, asphalts and polyalkylene glycol benzoates. The use of benzoates in two-component reactive adhesives/sealants based on liquid polysulfide polymers is also not disclosed in this document.

The liquid polysulfide polymers used for binder-containing component A according to the present invention are preferably the liquid LP 2, LP 12, LP 31 and LP 32 or LP 33 polymers from the Thiokol Co. or similar polymers from another manufacturer. These polymers, as is well known, are usually prepared by condensing bis (2-chloroethoxy)methane with sodium disulfide and/or sodium polysulfide and they have the following structures (I) and (II):

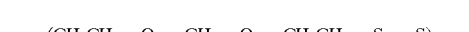

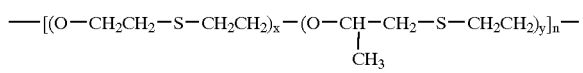

wherein x = 2, y = 1 and n = 6–50.

Instead of, or together with, the previously-mentioned polysulfide polymers, however, liquid polymercaptan polymers may also be used, these having been prepared by reacting a mercaptoalcohol with isocyanate-terminated prepolymers based on polyoxyalkylenes. Another possibility is the use of thioether polymercaptan-modified polysulfides. The two last-mentioned types of polymercaptans are described, for example, in DE-A-3508428 and EP-A-268836, EP-A-176439 or WO-8201879.

The benzoates to be used according to the present invention are preferably dibenzoates of ethylene glycol, diethylene glycol, triethylene glycol, tetraethylene glycol, propylene glycol, dipropylene glycol, tripropylene glycol, tetrapropylene glycol, 2,2,4-trimethyl-1,3-pentanediol, neopentyl glycol hydroxypivalate or mixtures of these benzoates.

Other constituents in component A are fillers, such as coated and/or non-coated chalks (calcium carbonate, calcium magnesium carbonate), aluminum silicates, magnesium silicates, kaolin, barytes or mixtures thereof. Furthermore, thixotropic agents, such as bentonites (montmorillonite), pyrogenic silicas, fibrous thixotropic agents are used, as well as pigments, such as titanium dioxide, carbon black and inorganic colored pigments. Furthermore, component A may also contain drying agents, such as molecular sieves, calcium oxide or barium oxide; it generally also contains adhesion promoters, such as organofunctional trialkoxysilanes and optionally retardants, such as long-chain fatty acids (stearic acid and derivatives thereof), as well as optional accelerators in the form of sulfur, magnesium acetate, thiurams, amines or guanidine derivatives.

Included among the organofunctional silanes used as adhesion promoters are, for example, 3-glycidoxypropyltrialkoxysilane, 3-acryloxypropyltrialkoxysilane, 3-aminopropyltrialkoxysilane, vinyltrialkoxysilane, N-aminoethyl-3-aminopropylmethyldialkoxysilane, phenylaminopropyltrialkoxysilane, aminoalkyltrialkoxydisilane or i-butylmethoxysilane. Methoxy or ethoxy groups are particularly preferred as alkoxy groups.

Component B contains, apart from the oxidising agent acting as a cross-linking agent such as lead oxide, manganese oxide, calcium peroxide, zinc peroxide, sodium perborate or organic peroxides, such as cumene hydroperoxide, as plasticiser, the benzoate plasticisers mentioned above and also the fillers, retardants, pigments, sulfur and/or antioxidants mentioned above. In rare cases it may also contain the adhesion promoters mentioned above. Furthermore, it contains optional accelerators, such as thiuram disulfides, guanidines, dithiocarbamates, amines.

Furthermore, curing component B preferably contains between 0.10 and 40 wt. % of a higher polymer selected from ethylene/vinyl acetate (EVA) copolymers, vinyl chloride/vinyl acetate copolymers or other copolymers which are compatible with the other components in the system.

EVA having a vinyl acetate content of 5 to 50% is particularly preferred.

Components A and B are usually used in the ratio of 10:1. Other mixing ratios are also possible, however, if components A and B are formulated in an appropriate manner.

Component A is prepared in a known manner by mixing the components in high-speed mixers, such as planetary mixers or compounders and the like, optionally under vacuum.

In the case of component B, the benzoate plasticiser is first mixed with the copolymer in the ratio, by weight, of about 40:1 to 40:0.1 at a temperature higher than 70° C., preferably between 120 and 140° C. This masterbatch is then mixed with the other constituents in a known manner to prepare component B, wherein it may be necessary first to make the solid oxidising agent, for example the particularly preferred manganese dioxide, into a paste with plasticisers and finely mill it, for example on a triple roll mill.

The present invention will be explained in more detail in the following Examples, wherein the choice of examples is not intended to represent any restriction on the scope of the present invention. All data relating to amounts of constituents in the formulations, unless indicated otherwise, are given in parts, by weight.

EXAMPLES ACCORDING TO THE PRESENT INVENTION AND COMPARISON EXAMPLES

The examples listed in the table below were prepared in a planetary mixer as described above.

| Example | Prior art | Accoring to the present invention | Comparison without copolymer |
|---|---|---|---|
| Component A | | | |
| Polysulfide polymer | 27.3 | 27.3 | 27.3 |
| Phthalate, low viscosity | 9.1 | | 9.1 |
| Benzylbutyl benzoate | | 9.1 | |
| Filler (chalk) | 53.6 | 53.6 | 53.6 |
| 3-glycidoxypropyl-trimethoxysilane | 1.0 | 1.0 | 1.0 |
| Component B | | | |
| Santicizer 278 | 3.6 | | |
| Benzoate, low viscosity | | 3.5 | |
| Benzylbutyl phthalate | | | 3.6 |
| EVA | | 0.1 | |
| Manganese dioxide | 2.7 | 2.7 | 2.7 |
| Accelerator | 0.3 | 0.3 | 0.3 |
| Filler | 2.5 | 2.5 | 2.5 |
| Shore-A hardness of mixture after 2 h 23° C., 50% rel. hum. | 27 | 40 | 20 |
| Centrifuge value (g) of comp. B (4000 rpm. 60 min) | 0.0 | 0.0 | 1.5 |
| Fogging (Mist on glass after 1000 h UV irradiation at 80° C.) | small amount | small amount | obvious |

The settling behavior of component B was tested using a centrifuge in such a way that the amount of separated, liquid phase ("supernatant") which had separated was determined after centrifuging at 4000 rpm for one hour. Both component B from the prior art having a highly viscous phthalate plasticiser and also component B according to the present invention had virtually no supernatant portion at all. The use of a low viscosity phthalate in the comparison trial produced a considerable supernatant portion (1.5 g) and in addition considerable "fogging" was observed in the comparison trial after UV irradiation for one thousand hours at 80° C.

The use of benzoate plasticisers according to the present invention simplified production since these ensure rapid and thorough mixing of the constituents as compared with the highly viscous phthlates used hitherto, despite preventing the deposition of solids. Furthermore, components A and B are easier to mix thoroughly because identical low viscosity plasticisers are used in the two components. In addition, an improved rate of curing, measured by the Shore A hardness of the mixture 2 hours after thoroughly mixing components A and B at 23° C., is observed.

What is claimed is:

1. A two-component insulating glass adhesive and sealant comprising a binder component (A) and a separate curing component (B), wherein:
   (A) the binder component comprises:
      (i) 15 to 35 wt. % of liquid polysulfide or liquid polymercaptan polymer or a mixture thereof,
      (ii) 5 to 20 wt. % of at least one benzoate plasticiser,
      (iii) 30 to 65 wt. % of fillers,
      (iv) 0.1 to 7 wt. % of a silane adhesion promoter; and
   (B) the curing component comprises:
      (i) 20 to 45 wt. % of at least one benzoate plasticiser,
      (ii) 0.1 to 40 wt. % of at least one copolymer,
      (iii) 10 to 40 wt. % of an oxidising agent,
      (iv) 1 to 15 wt. % of accelerator, and
      (v) 15 to 35 wt. % of fillers.

2. An insulating glass adhesive and sealant according to claim 1 which is essentially free of phthalate plasticiser.

3. An insulating glass adhesive and sealant according to claim 1 wherein the oxidising agent (iii) of the curing component (B) is selected from one or more of a group consisting of calcium peroxide, lead dioxide, zinc peroxide, manganese dioxide or cumene hydroperoxide.

4. An insulating glass adhesive and sealant according to claim 1 wherein the benzoate plasticiser in components (A) or (B) is independently selected from the benzoic acid esters of ethylene glycol, diethylene glycol, triethylene glycol, tetraethylene glycol, propylene glycol, dipropylene glycol, tripropylene glycol, tetrapropylene glycol, 2,2,4-trimethyl-1,3-pentanediol, neopentyl glycol hydroxypivalate or mixtures thereof.

5. An insulating glass adhesive and sealant according to claim 1 wherein the at least one copolymer (ii) of component (B) comprises ethylene/vinyl acetate copolymers or vinylchloride/vinyl acetate copolymers.

6. An insulating glass adhesive and sealant according to claim 1 wherein the at least one benzoate plasticiser of component (A)(ii) and component (B)(i) are identical and is a benzoate plasticiser having a low viscosity.

7. An insulating glass adhesive and sealant according to claim 1 having a Shore hardness of 40 or less after mixing of components (A) and (B) and curing for 2 hours at 23° C.

8. A process for producing an insulating glass adhesive and sealant according to claim 1 comprising mixing the at least one benzoate plasticiser of component (B) with the copolymer of component (B) and thereafter combining the resulting mixture with the other constituents of component (B).

9. A process according to claim 8 wherein the weight ratio of benzoate plasticiser to copolymer is from 40.1 to 40:0.1.

10. A process according to claim 9 wherein the mixing temperature is from 70° C. to 140° C.

11. A process according to claim 8 wherein the resulting insulating glass adhesive and sealant is essentially free of phthalate plasticiser.

12. A process according to claim 8 wherein the benzoate plasticiser in components (A) or (B) is independently selected from the benzoic acid esters of ethylene glycol, diethylene glycol, triethylene glycol, tetraethylene glycol, propylene glycol, dipropylene glycol, tripropylene glycol, tetrapropylene glycol, 2,2,4-trimethyl-1,3-pentanediol, neopentyl glycol hydroxypivalate or mixtures thereof.

13. A process according to claim 8 wherein the resulting insulating glass adhesive and sealant has a Shore hardness of 40 or less after mixing of components (A) and (B) and curing for 2 hours at 23° C.

14. A process for preparing an adhesive composition comprising:
   obtaining components A and B according to claim 1; and
   mixing said components.

15. The process of claim 14 wherein said adhesive composition is essentially free of phthalate plasticizer.

16. A process for insulating glass comprising:
   obtaining components A and B according to claim 1;
   mixing component A with component B to produce a mixture; and
   applying the mixture to the glass.

17. The process of claim 16 wherein said components are essentially free of phthalate plasticizer.

* * * * *

UNITED STATES PATENT AND TRADEMARK OFFICE
CERTIFICATE OF CORRECTION

PATENT NO. : 6,919,397 B2
DATED : July 19, 2005
INVENTOR(S) : Proebster et al.

It is certified that error appears in the above-identified patent and that said Letters Patent is hereby corrected as shown below:

<u>Column 6,</u>
Line 18, delete "40.1" and insert -- 40:1 --.

Signed and Sealed this

Eleventh Day of April, 2006

JON W. DUDAS
*Director of the United States Patent and Trademark Office*